(12) United States Patent
Joyce et al.

(10) Patent No.: US 8,667,478 B1
(45) Date of Patent: Mar. 4, 2014

(54) BACKWARD-COMPATIBILITY USING A PLUGIN ARCHITECTURE

(75) Inventors: Scott E. Joyce, Foxboro, MA (US);
Bruce R. Rabe, Dedham, MA (US);
Munish T. Desai, Shrewsbury, MA (US);
Scott B. Kay, Franklin, MA (US);
Sreenath Rajagopal, Natick, MA (US)

(73) Assignee: EMC Corporation, Hopkinton, MA (US)

( * ) Notice: Subject to any disclaimer, the term of this patent is extended or adjusted under 35 U.S.C. 154(b) by 704 days.

(21) Appl. No.: 12/884,577

(22) Filed: Sep. 17, 2010

(51) Int. Cl.
*G06F 9/44* (2006.01)

(52) U.S. Cl.
USPC ........................................... 717/170

(58) Field of Classification Search
None
See application file for complete search history.

(56) References Cited

U.S. PATENT DOCUMENTS

| | | |
|---|---|---|
| 6,748,581 B1 | 6/2004 | Bauer et al. |
| 6,971,090 B1 | 11/2005 | Gruttadauria et al. |
| 7,043,715 B1 | 5/2006 | Bauer et al. |
| 7,076,691 B1 | 7/2006 | Dobberpuhl et al. |
| 7,099,818 B1 * | 8/2006 | Nemecek et al. ............... 703/28 |
| 7,240,323 B1 | 7/2007 | Desai et al. |
| 7,386,835 B1 | 6/2008 | Desai et al. |
| 2004/0030768 A1 * | 2/2004 | Krishnamoorthy et al. .. 709/223 |
| 2005/0021886 A1 * | 1/2005 | Adema et al. ................... 710/33 |
| 2006/0230136 A1 * | 10/2006 | Ma ................................. 709/224 |
| 2008/0301783 A1 * | 12/2008 | Abrutyn et al. ................... 726/5 |

OTHER PUBLICATIONS

Scott E Joyce, et al., "File-driven Drag & Drop", U.S. Appl. No. 12/240,076, filed Sep. 29, 2008.
Scott E Joyce, et al., "Converting CQL Query Results Into User-Controllable Objects", U.S. Appl. No. 12/493,876, filed Jun. 29, 2009.
Scott E. Joyce, et al., "Object Searching in Data Storage Systems", U.S. Appl. No. 12/493,883, filed Jun. 29, 2009.
Scott E. Joyce, et al., "Information Retrieval Techniques Involving the Use of Prioritized Object Requests", U.S. Appl. No. 12/238,034, filed Sep. 25, 2008.
Scott E. Joyce, et al., "Method to Simplify Developing Software Having Localization", U.S. Appl. No. 12/238,926, filed Sep. 26, 2008.

* cited by examiner

*Primary Examiner* — Li B Zhen
*Assistant Examiner* — Sen Chen
(74) *Attorney, Agent, or Firm* — BainwoodHuang

(57) ABSTRACT

A method, to be performed in a computer, is provided. The method includes, for each of a plurality of devices, (a) detecting a hardware revision of that device, (b) selecting a version of a plugin associated with that hardware revision, and (c) loading the selected version of the plugin. At least one device of the plurality of devices has a different hardware revision than at least one other device of the plurality of devices. The version of the plugin associated with the one device is different than the version of the plugin associated with the other device. Corresponding computer program products and devices are also provided.

12 Claims, 5 Drawing Sheets

BACKWARD-COMPATIBILITY USING A PLUGIN ARCHITECTURE

BACKGROUND

In a data storage system, a management application may be used to control various aspects of the data storage system. For example, the data storage system may include multiple types of hardware, each type being present in multiple hardware revisions. In addition, the management application may include several plugin modules configured to perform different operations on the different elements of the data storage system Since some of these types of hardware and hardware revisions may have different features (such as, for example, the ability to support different kinds of RAID configurations), a graphical user interface for the management application must be able to display different kinds of information for each type and/or hardware revision. This can be accomplished by hard-coding different display information for every type and hardware revision using if-then-else blocks or switch statements. For example, in a plugin module for creating a new RAID group, if an old hardware revision (rev 1) only supports RAID levels 0 and 1, but newer hardware revisions (revs 2-5) supports RAID layers 0, 1, and 5, and a still newer hardware revision (rev 6) supports RAID levels 1, 5, and 5+1, the display code for the plugin module must be written to present the user with different options depending on the hardware revision of the device that the user is attempting to manage. For example (in pseudo code):

```
String Options[5]
Option1 = "RAID 0"
Option2 = "RAID 1"
Option3 = "RAID 5"
Option4 = "RAID 5+1"
Switch (RevisionNumber) {
    Case 1:
        Options[ ]= {Option1, Option2, NULL, NULL, NULL}
    Case 2: Case 3: Case 4: Case 5:
        Options[ ]= {Option1, Option2, Option3, NULL, NULL}
    Case 6:
        Options[ ]= {Option2, Option3, Option4, NULL, NULL}
}
PrintDropDownBox (Options[ ])
```

SUMMARY

However, the above-described techniques suffer from deficiencies. For example, code that is full of Switch statements can be difficult to modify and maintain. It can also lead to errors. For example, continuing with the above example, if a new hardware revision 7 is added that adds in the options to use RAID levels 2, 3, 4, 1+0, and 5+0, then the size of the Options array must be increased to at least 8. However, if the programmer forgets to add in extra NULL pointers to the definitions of Options[ ] in the code for the pre-existing cases, revisions 1-6 may include un-initialized pointers. Even if the programmer remembers to add in the extra NULL pointers, the coding will be more cumbersome than is desirable. As an additional example, it should be noted that this technique can lead to very large code. If the programmer wishes to reduce the size of the code or reduce the chance of error, he may opt to remove support for old hardware revisions (e.g., by eliminating certain case values from all switch statements), thereby reducing support for old hardware.

In contrast, embodiments of the present invention are directed to techniques for providing backward-compatibility using a plugin architecture. In one embodiment, a method is presented for providing different versions of a plugin and only loading the versions that are needed. This solution simplifies the structure of the code, reducing or eliminating the need for cumbersome Switch statements. It also allows old hardware versions to retain support, while simultaneously reducing the memory footprint of the code when only a limited number of old hardware revisions are actually in use. In one embodiment, providing different versions of the plugin is accomplished by using different namespaces for different hardware revisions and defining different versions of the same plugin in each namespace. This approach allows code to be easily shared regardless of the specific hardware revision in use.

In particular, in one embodiment, a method, to be performed in a computer, is provided. The method includes, for each of a plurality of devices, (a) detecting a hardware revision of that device, (b) selecting a version of a plugin associated with that hardware revision, and (c) loading the selected version of the plugin. At least one device of the plurality of devices has a different hardware revision than at least one other device of the plurality of devices. The version of the plugin associated with the one device is different than the version of the plugin associated with the other device.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments are provided for simplifying the code in a management application for managing different versions of devices using plugin modules. Embodiments of the present invention are directed to techniques for providing backward-compatibility using a plugin architecture. In one embodiment, a method is presented for providing different versions of a plugin and only loading the versions that are needed. This solution simplifies the structure of the code, reducing or eliminating the need for cumbersome Switch statements. It also allows old hardware versions to retain support, while simultaneously reducing the memory footprint of the code when only a limited number of old hardware revisions are actually in use. In one embodiment, providing different versions of the plugin is accomplished by using different namespaces for different hardware revisions and defining different versions of the same plugin in each namespace. This approach allows code to be easily shared regardless of the specific hardware revision in use.

Figure 1:
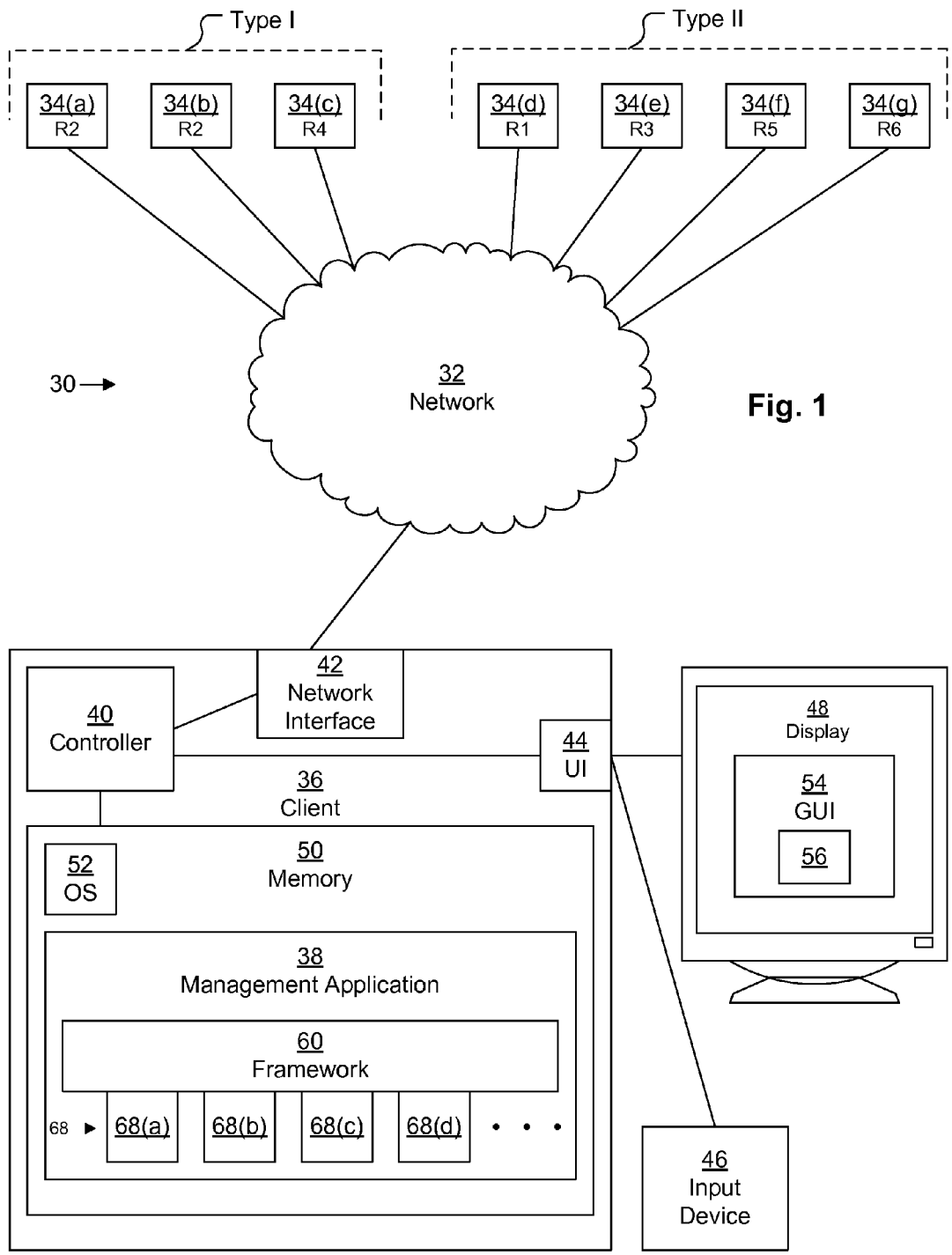
FIG. 1 illustrates a system and apparatus for use in performing various embodiments.

FIG. 1 depicts a system 30, such as a data storage system, according to one embodiment. System 30 includes a network 32, a set of devices 34 (depicted as devices 34(a)-34(g)), and a client computer 36. In one embodiment, network 32 is the Internet, while in other embodiments, network 32 is a local area network, a wide area network, a storage area network, a virtual private network, or any other type of network.

Devices 34 may be any kinds of devices, however, in one embodiment, devices 34 are discrete data storage arrays. In other embodiments, devices 34 may include data storage devices such as disks or non-storage devices, such as switches and routers. As depicted, in some arrangements, devices 34(a)-34(c) are devices of Type I, while devices 34(d)-34(f) are devices of Type II. Type I devices may be, for example, enterprise-level storage arrays, such as, for example, Symmetrix data arrays produced by EMC Corp. of Hopkinton, Mass. Type II devices may be, for example, midrange-level storage arrays, such as, for example, Clariion data arrays produced by EMC Corp. of Hopkinton, Mass. Each of the devices of either Type I or Type II can be configured with different hardware release versions. For example, as depicted, Type I devices 34(a) and 34(b) are both hardware revision R2 compliant, while Type I device 34(c) is hardware revision R4 compliant. Type II device 34(d) is hardware revision R1 compliant. Type II device 34(e) is hardware revision R3 compliant. Type II device 34(f) is hardware revision R5 compliant. Type II device 34(g) is hardware revision R6 compliant.

In one embodiment, client computer 36 is a user-accessible workstation that runs management application 38. Management application 38 is a piece of software that allows a user to manage the various storage arrays 34 of the data storage system 30 from a central location. Client computer 36 may be a computer or any other sort of digital device (such as, for example, a smart phone) capable of running management application 38.

Client computer 36 includes a controller 40 (such as, for example, a general-purpose microprocessor, a processor, a central processing unit, dedicated circuitry, etc.), a network interface 42 for connecting to network 32, a user interface 44, and memory 50. User interface 44 connects to a user input device 46 (such as, for example, a mouse, keyboard, tracking pad, trackball, touch-screen, tablet, keypad, etc.) and an output device such as display 48 (such as, for example, a computer monitor or an embedded display screen). Memory 50 may include one or more of the following: random access memory (RAM), read-only-memory, system memory, volatile memory, non-volatile memory, static RAM, flash memory, non-volatile data storage, optical storage, electromagnetic storage, floppy disk, hard disk, CD-ROM, DVD-ROM, Bluray, etc.). Memory 50 stores, inter alia, operating system 52 and management application 38. Display 48 depicts a graphical user interface (GUI) 54, which displays a set of particular options 56.

Management application 38 includes a central framework 60, which includes standard features of a management application for a data storage system (as described in further detail below, in connection with FIG. 3). Framework 60 communicates with various plugin modules 68 (which implement specific operations that can be selected by the user). Any given plugin module 68 is not a mandatory element of the management application 38, although management application 38 will generally include a set of plugin modules 68 for performing various operations associated with various devices 34. As depicted, four plugin modules 68(a)-68(d) are installed within management application 38. In one embodiment, plugin modules 68(a)-68(d) all implement one specific plugin (being associated with a specific operation, such as, for example, creating a RAID group), however, each of the plugin modules 68(a)-68(d) are configured to support specific hardware revisions of the devices 34. For example, plugin module 68(a) supports hardware revisions R1-R3 (for legacy support), plugin module 68(b) supports hardware revision R4, plugin module 68(c) supports hardware revision R5, and plugin module 68(d) supports hardware revision R6. Alternate embodiments are described below in connection with FIG. 3.

Figure 2:
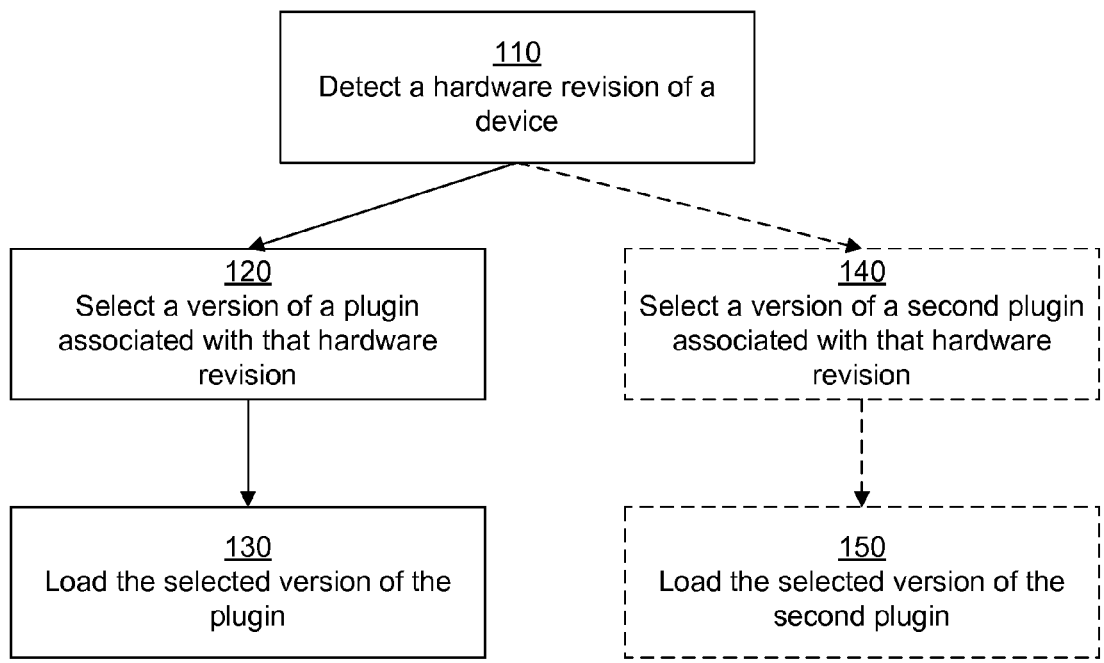
FIG. 2 illustrates method of various embodiments.

FIG. 2 depicts a method 100 performed at client computer 36 by management application 38. In one embodiment, client computer 36 performs method 100 at startup for every device 34 attached to the data storage system 30.

In step 110, client computer 36 detects the hardware revision of the device 34. In some embodiments (described in more detail below, in connection with FIG. 3), client computer 36 also determines the device type (e.g., Type I or Type II, Symmetrix or Clariion, etc.) of the device 34. This step can be accomplished by receiving a signal from the device 34 indicating its hardware revision as part of the initialization the device 34.

In step 120, client computer 36 selects a particular version of a plugin associated with the hardware revision (and device type) of the device 34. This step can be accomplished in several ways, such as by referring to an index of plugin versions 68 associated with particular hardware revisions.

In step 130, client computer loads the selected plugin version into memory 50.

For example, with reference to the earlier example and the method of FIG. 2, when management application 38 starts up, the following occurs. At startup, management application 38 detects each device 34 connected to data storage system 30. Management application 38 then applies method 100 to each detected device, in turn, for each available plugin. Thus, since device 34(a) is an R2 device, management application 38 loads plugin module 68(a), which implements the plugin for R1-R3. When device 34(b), which is also an R2 device, is detected, management application 38 does not need to load any further plugin module 68, because plugin module 68(a), supporting R1-R3, has already been loaded. When device 34(c), which is an R4 device, is detected, management application 38 loads plugin module 68(b), which implements the plugin for R4. When devices 34(d) and 34(e), which are R1 and R3, respectively, are detected, management application 38 does not need to load any further plugin module 68, because plugin module 68(a), supporting R1-R3, has already been loaded. When device 34(f), which is an R5 device, is detected, management application 38 loads plugin module 68(c), which implements the plugin for R5. When device 34(g), which is an R6 device, is detected, management application 38 loads plugin module 68(d), which implements the plugin for R6.

Thus, by providing multiple plugin modules 68 for a single plugin, embodiments simplify the structure of the code, reducing or eliminating the need for cumbersome Switch statements. They also allows old hardware versions to retain support, while simultaneously reducing the memory footprint of the code when only a limited number of old hardware revisions are actually in use.

As mentioned previously, management application 38 can differentiate between different types of devices as well as different plugins. Additional details of management application 38, allowing for more sophisticated embodiments, are depicted in FIG. 3.

Figure 3:
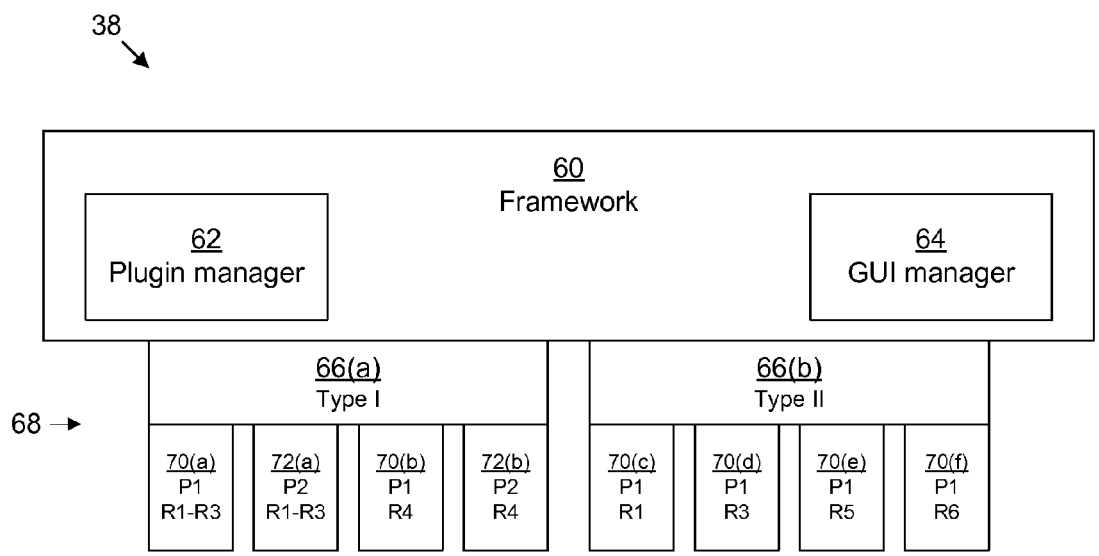
FIG. 3 illustrates the structure of computer code for use in performing various embodiments.

In FIG. 3, framework 60 includes, inter alia, a plugin manager 62 and a GUI manager 64. GUI manager 64 implements how the management application 38 communicates with the user via user interface 44 and GUI 54. Plugin manager 62 interfaces with various plugin modules 68, and selects among them (e.g, using method 100 or a similar or related method). Plugin modules 68 can come in two forms—general type plugins 66 and specific version plugins 70, 72. In some embodiments general type plugins 66 interpose between plugin manager 62 and specific version plugins 70, 72. In other embodiments, general type plugins 66 may be omitted. In FIG. 3, framework 60 is connected to two general type plugins 66: Type I general plugin 66(a) and Type II general plugin 66(b). Each general type plugin 66 may generally be used in conjunction with devices 34 of a general type. For example, Type I general plugin 66(a) may be used in conjunction with Type I devices, which, as described above, may be, for example, enterprise-level storage arrays, such as, for example, Symmetrix data arrays produced by EMC Corp. of Hopkinton, Mass. Type II general plugin 66(b) may be used in conjunction with Type II devices, which, as described above, may be, for example, midrange-level storage arrays, such as, for example, Clariion data arrays produced by EMC Corp. of Hopkinton, Mass.

Specific version plugins 70, 72 actually implement the functionality of the plugin based on specific hardware revisions. As depicted, specific version plugin 70(a) implements plugin P1 for hardware revisions R1-R3 of Symmetrix systems, specific version plugin 70(b) implements plugin P1 for hardware revision R4 of Symmetrix systems, specific version plugin 70(c) implements plugin P1 for hardware revision R1 of Clariion systems, specific version plugin 70(d) implements plugin P1 for hardware revision R3 of Clariion systems, specific version plugin 70(e) implements plugin P1 for hardware revisions R5 of Clariion systems, and specific version plugin 70(f) implements plugin P1 for hardware revision R6 of Clariion systems. Specific version plugin 72(a) implements plugin P2 for hardware revisions R1-R3 of Symmetrix systems and 72(b) implements plugin P2 for hardware revision R4 of Symmetrix systems.

Returning to FIG. 2, method 100 can also optionally include steps 140 and 150. In optional step 140, client computer 36 also selects a particular version of a second plugin associated with the hardware revision (and device type) of the device 34. This step can be accomplished in several ways, such as, for example, by referring to an index of plugin versions 68 associated with particular hardware revisions.

In step 130, client computer loads the selected plugin version of the second plugin into memory 50.

Thus, embodiments are able to manage a management application 38 having multiple plugins as well as multiple type of devices, each of which may have entirely different feature sets.

Figure 4:
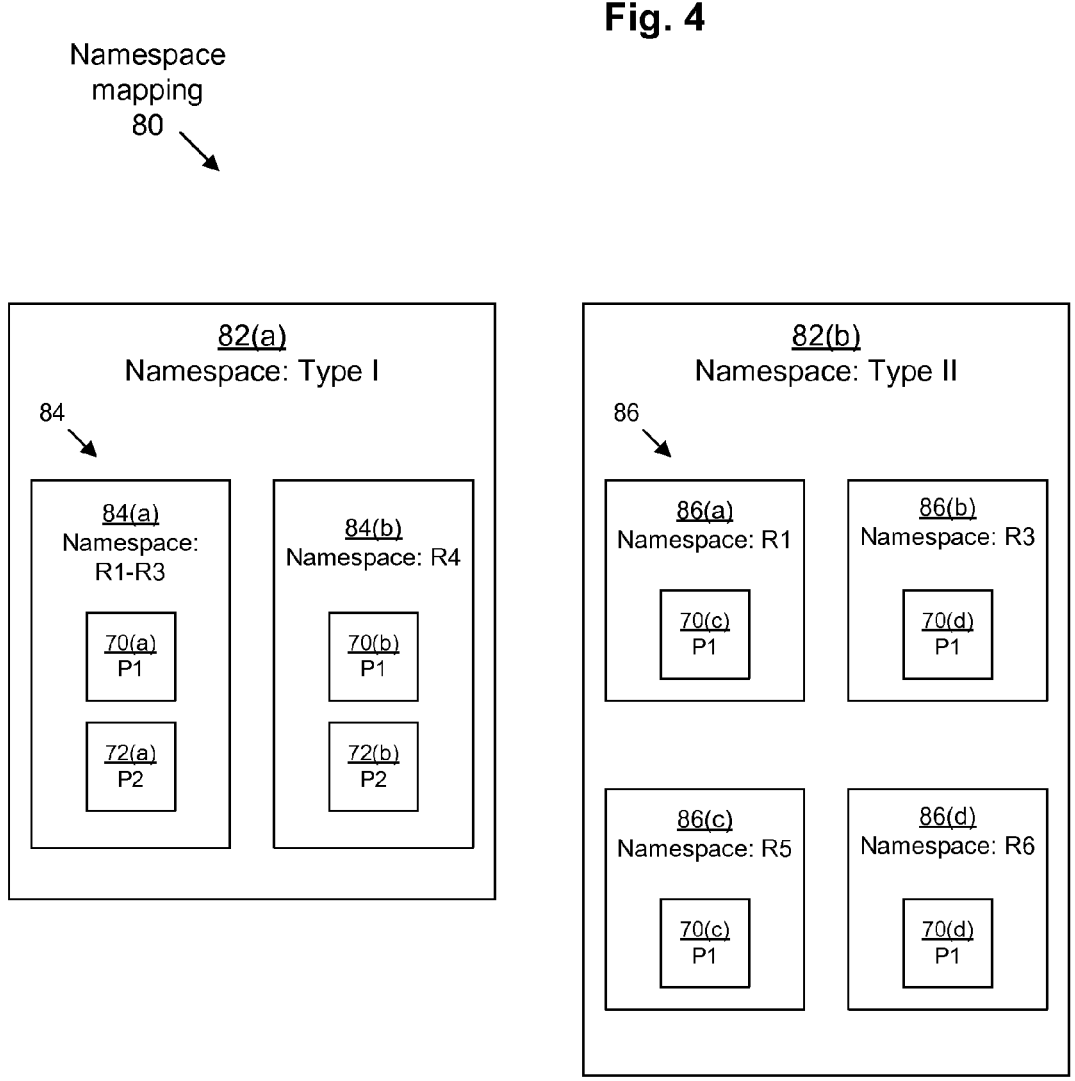
FIG. 4 illustrates a Namespace hierarchy for use in performing various embodiments.

In addition, as mentioned previously, management application 38 can utilize namespaces to simplify steps 120 and 130 (and 140-150) as depicted in FIG. 2. FIG. 4 depicts a namespace mapping 80 for use in several embodiments. Namespace mapping 80 includes two namespaces 82: a namespace 82(a) for Type I (e.g., Symmetrix) devices and a namespace 82(b) for Type II (e.g., Clariion) devices. Type I namespace 82(a) includes two low-level namespaces 84: 84(a) for hardware revisions R1-R3 and 84(b) for hardware revision R4. Type II namespace 82(b) includes four low-level namespaces 86: 86(a) for hardware revision R1, 86(b) for hardware revision R3, 86(c) for hardware revision R5, and 86(d) for hardware revision R6. It should be understood that the Type namespaces 82 are optional, and namespace mapping 80 may only include low-level namespaces 84, 86. It should also be understood that the number of low-level namespaces 84, 86 and the specific hardware revisions assigned to each is merely an example, and a different number of low-level namespaces 84, 86 may be provided and with a different set of hardware revision assignments.

It should be noted that low-level namespace 84(a) represents 3 different hardware revisions, R1, R2, and R3. This allows for legacy support within system 30. Thus, the plugin versions 70(a), 72(a) within namespace 84(a) may be legacy plugins written to support multiple hardware revisions (e.g., using Switch statements, such as in the example provided in the Background section, above). However, namespace 84(b) represents newer hardware revision R4. Therefore, plugin versions 70(b), 72(b) within namespace 84(b) are specifically designed to support hardware version R4, and the complexity of these plugin versions 70(b), 72(b) can be significantly reduced in comparison to legacy-style plugin versions 70(a), 72(a) within namespace 84(a).

Returning to FIG. 2, in some embodiments, as part of step 110, upon detecting the hardware revision (and device type) of device 34, plugin manager 62 may cause the namespace associated with that device 34 to be set based on those values (such as, for example, by defining an object having the appropriate namespace to represent that device 34). Steps 120 and 130 may then be accomplished merely by choosing to load the selected plugin, the associated namespace serving to distinguish which specific plugin version 70 is to be loaded.

For example, with continued reference to FIG. 4, when management application 38 starts up, the following occurs. At startup, management application 38 detects each device 34 connected to data storage system 30. Method 100 is then applied to each detected device in turn for each available plugin. Thus, since device 34(a) is an R2 Symmetrix, and Symmetrix systems have 2 available plugins (plugins 1 and 2—see FIG. 4) plugin manager 62 loads plugin versions 70(a) and 72(a). Since device 34(b) is also an R2 Symmetrix, the same plugin versions 70(a), 72(a) are loaded (or, in one embodiment, no plugin versions are loaded since the correct plugin versions have already been loaded). Since device 34(c) is an R4 Symmetrix, and Symmetrix systems have 2 available plugins (plugins 1 and 2) plugin manager 62 loads plugin versions 70(b) and 72(b). Since device 34(d) is an R1 Clariion, and Clariion systems have only 1 available plugin (plugin P1—see FIG. 4) plugin manager 62 loads plugin version 70(c). Since device 34(e) is an R3 Clariion, and Clariion systems have only 1 available plugin (plugin P1) plugin manager 62 loads plugin version 70(d). Since device 34(f) is an R5 Clariion, and Clariion systems have only 1 available plugin (plugin P1) plugin manager 62 loads plugin version 70(e). Since device 34(g) is an R6 Clariion, and Clariion systems have only 1 available plugin (plugin P1) plugin manager 62 loads plugin version 70(f).

Because only plugin versions 70(a)-70(f) and 72(a)-72(b) are needed, only these eight plugin versions are loaded into memory 50. Thus, memory 50 is not bogged down with code for every possible device type and hardware revision, thereby saving memory space. In addition, at installation time, only these eight plugin versions are installed on client computer 36. Other plugin versions may simply be omitted from the installation process unless and until additional devices 34 are added to system 30.

When a user wishes to perform a particular operation on a device 34, the appropriate plugin version may then easily be run. For example, if user wishes to perform operation 1 (e.g, attempt to create a RAID group) on device 34(c), plugin manager 62 will invoke plugin P1 in the Type I: R4 namespace (i.e., namespace 84(b)—see FIG. 4), which will cause plugin version 70(b) to run. Upon running, plugin version 70(b) will, through GUI manager 64, cause options 56 associated with performing RAID group creation on an R4 Symmetrix array to be displayed on screen 48 through GUI 54. Once the user selects the desired options 56, these options are then sent to device 34(*c*) so that that device 34(*c*) can execute the RAID group creation operation locally.

As an additional example, if user wishes to perform operation 1 on device 34(*f*), plugin manager 62 will invoke plugin P1 in the Type II: R5 namespace (i.e., namespace 86(*c*)—see FIG. 4), which will cause plugin version 70(*e*) to run. Upon running, plugin version 70(*e*) will, through GUI manager 64, cause options 56 associated with performing RAID group creation on an R5 Clariion array to be displayed on screen 48 through GUI 54. Once the user selects the desired options 56, these options are then sent to device 34(*f*) so that that device 34(*f*) can execute the RAID group creation operation locally.

As an additional example, if user wishes to perform operation 2 (e.g., attempt to delete a RAID group) on device 34(*a*), plugin manager 62 will invoke plugin P2 in the Type I: R1-R3 namespace (i.e., namespace 84(*a*), representing Symmetrix hardware revisions R1, R2, and R3—see FIG. 4), which will cause plugin version 72(*a*) to run. Upon running, plugin version 72(*a*) will, through GUI manager 64, cause options 56 associated with performing RAID group creation on an R2 Symmetrix array (which has the same options as on an R1 or R3 Symmetrix array) to be displayed on screen 48 through GUI 54. Once the user selects the desire options 56, these options are then sent to device 34(*a*) so that that device 34(*a*) can execute the RAID group deletion operation locally. It should be noted that, within the context of this hypothetical example, operation 2 is not supported on Type II devices, so no plugin versions supporting plugin P2 are needed within the Type II namespaces 86.

Figure 5:
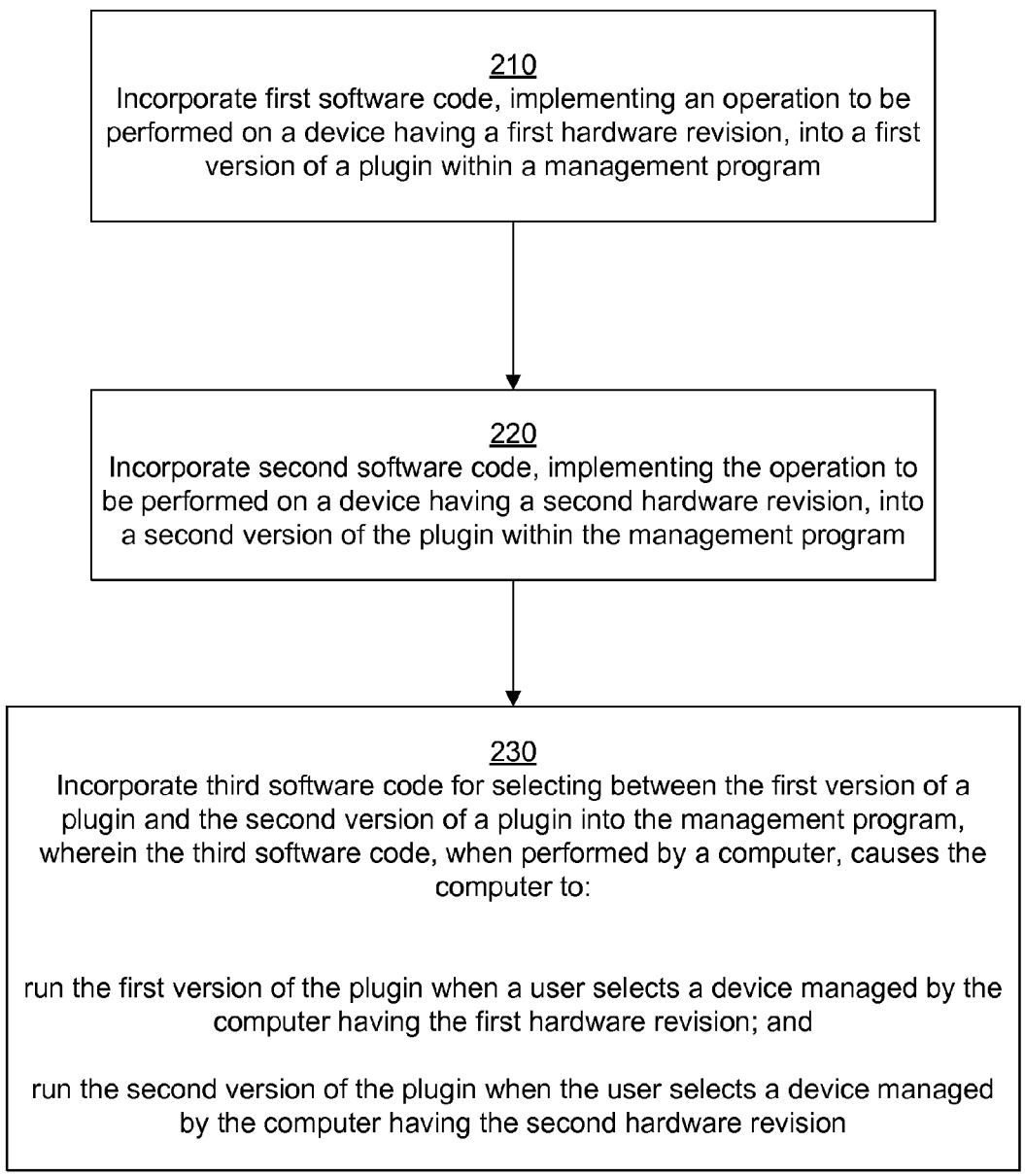
FIG. 5. illustrates a method of one embodiment.

Although methods have been described as being performed by management application 38 (or more precisely, by controller 40 while running management application 38), related methods can also be performed at application design-time. In FIG. 5, a method 200 is provided for coding management application 38. In step 210, a programmer incorporates software code for performing an operation on a device 34 having a first hardware revision into a first plugin version. In step 220, programmer incorporates software code for performing the operation on a device 34 having a second, different, hardware revision into a second, different, plugin version. In step 230, programmer incorporates software code for selecting between the first and second plugin versions into management application 38. This code includes instructions, which cause the controller 40 to run the first version of the plugin when a user selects a device managed by the computer having the first hardware revision, and run the second version of the plugin when the user selects a device managed by the computer having the second hardware revision.

In one embodiment, the code in step 230 is incorporated into plugin manager 62. The code for the management application 38 may then be compiled, linked, assembled, distributed, and installed on data storage systems 30.

While various embodiments of the invention have been particularly shown and described, it will be understood by those skilled in the art that various changes in form and details may be made therein without departing from the spirit and scope of the invention as defined by the appended claims.

For example, although embodiments have been described as being management applications for a GUI of a data storage system, it should be understood that the invention is not limited to this context. In some embodiments, the inventive concept can be applied to aspects of software applications other than GUIs. Furthermore, in some embodiments, the inventive concept can be applied to software applications other than management applications of data storage systems. For example, the inventive concept could also be applied to management of a system of networking equipment, such as switches, hubs, and routers.

As an additional example, although Symmetrix systems have been described as having two kinds of available plugins and Clariion systems as having only one kind of available plugin, this is by way of example only. In fact, each type of array typically has many more available plugins.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method performed in a computer, the method comprising, for each of a plurality of devices:
  detecting a hardware revision of that device;
  selecting a version of a plugin associated with that hardware revision; and
  loading the selected version of the plugin;
  wherein:
    at least one device of the plurality of devices has a first hardware revision and at least one other device of the plurality of devices has a second hardware revision different than the first hardware revision;
    the version of the plugin associated with the one device is a first version of the plugin and the version of the plugin associated with the other device is a second version of the plugin different than the first version;
    the first hardware revision is associated with a first namespace;
    the second hardware revision is associated with a second namespace distinct from the first namespace;
    selecting the version of the plugin associated with that hardware revision includes:
      selecting the first namespace as an active namespace in connection with the first hardware revision; and
      selecting the second namespace as the active namespace in connection with the second hardware revision; and
    loading the selected version of the plugin includes running the plugin within the active namespace.

2. The method of claim 1 wherein:
  the plugin is a first plugin;
  the method further comprises, for each of the plurality of devices:

selecting a version of a second plugin associated with that hardware revision; and
loading the selected version of the second plugin; and
selecting the version of the second plugin associated with that hardware revision includes choosing the unique namespace associated with that hardware revision.

3. The method of claim 1 wherein:
the plurality of devices includes a plurality of data storage devices; and
the method further comprises:
generating a graphical user interface for a data storage system; and
for each of the plurality of devices, running the version of the plugin loaded for that device, wherein running the version of the plugin includes displaying, as part of the graphical user interface, options particular to the hardware revision of that device.

4. A computer program product comprising a tangible non-transitory computer-readable medium storing computer code, which, when executed by a computer, causes the computer to perform a method, wherein the computer code includes:
a first version of a plugin, the first version of the plugin including instructions for performing an operation on a device having a first hardware revision;
a second version of the plugin, different than the first version of the plugin, the second version of the plugin including instructions for performing the operation on a device having a second hardware revision, the first hardware revision being different than the second hardware revision; and
instructions for selecting between the first version of the plugin and the second version of the plugin, wherein these instructions, when executed by the computer, cause the computer to:
run the first version of the plugin when a user selects a device managed by the computer having the first hardware revision; and
run the second version of the plugin when the user selects a device managed by the computer having the second hardware revision;
wherein:
the computer code defines:
a first namespace associated with the first hardware revision; and
a second namespace, distinct from the first namespace, associated with the second hardware revision; and
the instructions for selecting between the first version of the plugin and the second version of the plugin include instructions, which, when executed by the computer, cause the computer to:
select the first namespace as an active namespace when the user selects a device managed by the computer having the first hardware revision;
select the second namespace as the active namespace when the user selects a device managed by the computer having the second hardware revision; and
run the plugin within the active namespace.

5. The computer program product of claim 4 wherein:
the plugin is a first plugin;
the operation is a first operation;
the computer code further defines:
a first version of a second plugin, the first version of the second plugin including instructions for performing a second operation on a device having a first hardware revision, the second operation is distinct from the first operation; and
a second version of the second plugin, different than the first version of the second plugin, the second version of the second plugin including instructions for performing the second operation on a device having a second hardware revision; and
the computer code further includes instructions for selecting between the first version of the second plugin and the second version of the second plugin, wherein these instructions, when executed by the computer, cause the computer to:
run the first version of the second plugin when the user selects a device managed by the computer having the first hardware revision; and
run the second version of the second plugin when the user selects a device managed by the computer having the second hardware revision.

6. The computer program product of claim 4 wherein:
the first namespace is nested under a third namespace, the third namespace representing a first type of hardware device;
the second namespace is nested under a fourth namespace, the fourth namespace representing a second type of hardware device, the second type of hardware device being different than the first type of hardware device.

7. The computer program product of claim 4 wherein:
the computer program product implements a graphical user interface for a data storage system, the data storage system including a plurality of data storage devices, at least one of the plurality of data storage devices having a different hardware revision than another one of the plurality of data storage devices;
the instructions for performing the operation on the device having the first hardware revision include instructions for displaying, as part of the graphical user interface, options particular to the hardware revision of that device; and
the instructions for performing the operation on the device having the second hardware revision include instructions for displaying, as part of the graphical user interface, options particular to the hardware revision of that device.

8. The computer program product of claim 4 wherein:
the first version of the plugin further includes instructions for performing the operation on a device having a third hardware revision, the third hardware revision being different than the first hardware revision and the second hardware revision;
the second hardware revision is chronologically more recent than both the first hardware revision and the third hardware revision; and
the instructions for selecting between the first version of the plugin and the second version of the plugin, further include instructions, which, when executed by the computer, cause the computer to:
run the first version of the plugin when a user selects a device managed by the computer having the third hardware revision.

9. An apparatus comprising:
a network interface controller (NIC), the NIC being configured to communicate with a plurality of devices; and
a processor, the processor being configured to, for each of the plurality of devices:
detect a hardware revision of that device;
select a version of a plugin associated with that hardware revision; and
load the selected version of the plugin;
wherein:

at least one device of the plurality of devices has a first hardware revision and at least one other device of the plurality of devices has a second hardware revision different than the first hardware revision;

the version of the plugin associated with the one device is a first version of the plugin and the version of the plugin associated with the other device is a second version of the plugin different than the first version;

the first hardware revision is associated with a first namespace;

the second hardware revision is associated with a second namespace distinct from the first namespace;

the processor, when configured to select the version of the plugin associated with that hardware revision, is configured to:
  select the first namespace as an active namespace in connection with the first hardware revision; and
  select the second namespace as the active namespace in connection with the second hardware revision; and the processor, when configured to load the selected version of the plugin, is configured to run the plugin within the active namespace.

10. The apparatus of claim 9 wherein:
the plugin is a first plugin;
the processor is further configured to, for each of the plurality of devices:
  select a version of a second plugin associated with that hardware revision; and
  load the selected version of the second plugin; and
the processor, when configured to select the version of the second plugin associated with that hardware revision, is configured to choose the unique namespace associated with that hardware revision.

11. The apparatus of claim 9 wherein:
the apparatus further includes a user interface;
the plurality of devices includes a plurality of data storage devices; and
the processor is further configured to:
  generate a graphical user interface, displayed via the user interface, for a data storage system; and
  for each of the plurality of devices, run the version of the plugin loaded for that device, wherein running the version of the plugin includes displaying, as part of the graphical user interface, options particular to the hardware revision of that device.

12. The method of claim 2 wherein selecting the version of the second plugin associated with that hardware revision further includes loading the second plugin within the chosen unique namespace associated with that hardware revision, the first plugin and the second plugin performing different functions.

* * * * *